US 8,615,643 B2

(12) United States Patent
Cohen et al.

(10) Patent No.: US 8,615,643 B2
(45) Date of Patent: Dec. 24, 2013

(54) OPERATIONAL EFFICIENCY OF VIRTUAL TLBS

(75) Inventors: Ernest S. Cohen, Wyncote, PA (US);
John Te-Jui Sheu, Redmond, WA (US);
Landy Wang, Redmond, WA (US);
Matthew D. Hendel, Seattle, WA (US);
Rene Antonio Vega, Kirkland, WA (US);
Sharvil A. Nanavati, Dundas (CA)

(73) Assignee: Microsoft Corporation, Redmond, WA (US)

( * ) Notice: Subject to any disclaimer, the term of this patent is extended or adjusted under 35 U.S.C. 154(b) by 1111 days.

(21) Appl. No.: 11/634,782

(22) Filed: Dec. 5, 2006

(65) Prior Publication Data
US 2008/0133875 A1    Jun. 5, 2008

(51) Int. Cl.
*G06F 12/00* (2006.01)
(52) U.S. Cl.
USPC ............ 711/207; 711/205; 711/171; 711/154
(58) Field of Classification Search
USPC ......................................... 711/173, 206, 207
See application file for complete search history.

(56) References Cited

U.S. PATENT DOCUMENTS

| | | | |
|---|---|---|---|
| 4,980,816 A * | 12/1990 | Fukuzawa et al. | 711/207 |
| 5,317,705 A | 5/1994 | Gannon et al. | 718/100 |
| 5,586,283 A | 12/1996 | Lopez-Aguado et al. | 711/207 |
| 5,699,543 A | 12/1997 | Saxena | 711/203 |
| 5,787,494 A | 7/1998 | DeLano et al. | 711/206 |
| 6,075,938 A | 6/2000 | Bugnion et al. | 703/27 |
| 6,182,195 B1 | 1/2001 | Laudon et al. | 711/141 |
| 6,442,666 B1 | 8/2002 | Stracovsky | 711/206 |
| 6,721,839 B1 | 4/2004 | Bauman et al. | 710/305 |
| 6,785,886 B1 | 8/2004 | Lim et al. | 718/1 |
| 6,907,600 B2 | 6/2005 | Neiger et al. | 717/139 |
| 7,069,389 B2 | 6/2006 | Cohen | 711/135 |
| 7,069,413 B1 | 6/2006 | Agesen et al. | 711/207 |
| 7,111,145 B1 | 9/2006 | Chen et al. | 711/206 |
| 2002/0082824 A1 | 6/2002 | Neiger et al. | 704/2 |
| 2002/0169938 A1 | 11/2002 | Scott et al. | 711/207 |
| 2004/0003323 A1* | 1/2004 | Bennett et al. | 714/36 |

(Continued)

OTHER PUBLICATIONS

Chang, MS et al., "Lazy TLB Consistency for Large-Scale Multiprocessors," IEEE, http://ieeexplore.ieee.org/iel3/4457/12637/00581683.pdf?tp=&arnumber=581683&isnumber=12637&htry=2, 1997, 308-315.

(Continued)

*Primary Examiner* — Aimee Li
*Assistant Examiner* — Brendan Lillis
(74) *Attorney, Agent, or Firm* — Woodcock Washburn, LLP

(57) ABSTRACT

Various mechanisms are disclosed for improving the operational efficiency of a virtual translation look-aside buffer (TLB) in a virtual machine environment. For example, one mechanism fills in entries in a shadow page table (SPT) and additionally, speculatively fills in other entries in the SPT based on various heuristics. Another mechanism allows virtual TLBs (translation look-aside buffers) to cache partial walks in a guest page table tree. Still another mechanism allows for dynamic resizing of the virtual TLB to optimize for run-time characteristics of active workloads. Still another mechanism allows virtual machine monitors (VMMs) to support legacy and enlightened modes of virtual TLB operation. Finally, another mechanism allows the VMM to remove only the stale entries in SPTs when linking or switching address spaces. All these mechanisms, together or in part, increase the operational efficiency of the virtual TLB.

18 Claims, 10 Drawing Sheets

(56) References Cited

U.S. PATENT DOCUMENTS

| | | | | |
|---|---|---|---|---|
| 2005/0015562 | A1* | 1/2005 | Goodsell | 711/170 |
| 2005/0044301 | A1 | 2/2005 | Vasilevsky et al. | 711/1 |
| 2005/0044339 | A1 | 2/2005 | Sheets | 711/206 |
| 2005/0172099 | A1 | 8/2005 | Lowe | 711/207 |
| 2006/0026383 | A1 | 2/2006 | Dinechin et al. | 711/207 |
| 2006/0064567 | A1 | 3/2006 | Jacobson et al. | 711/207 |
| 2006/0069885 | A1* | 3/2006 | Matsui et al. | 711/154 |
| 2006/0112212 | A1 | 5/2006 | Hildner | 711/6 |
| 2006/0174053 | A1 | 8/2006 | Anderson et al. | 711/6 |
| 2006/0259732 | A1* | 11/2006 | Traut et al. | 711/173 |
| 2006/0259734 | A1 | 11/2006 | Sheu et al. | 711/203 |
| 2008/0005447 | A1* | 1/2008 | Schoenberg et al. | 711/6 |

OTHER PUBLICATIONS

Eranian, S. et al., "Virtual Memory in the IA-64 Linux Kernel," *Prentice Hall PTR,* www.phptr.com/articles/article.asp?p+29961&seqNum+4&r1+1, 2002, downloaded Aug. 31, 2006, 12 pages.

King, S. et al., "Operating System Support for Virtual Machines," *Proceedings of the 2003 USENIX Technical Conference,* http://www.eecs.umich.edu/virtualpapers/king03.pdf, 2003, 14 pages.

LeVasseur, J. et al., "Pre-Virtualization: Slashing the Cost of Virtualization," *Nat'l ICT Australia,* 2005, 1-14.

Rosenburg, B.S., "Low-Synchronization Translation Lookaside Buffer Consistency in Large-Scale Shared-Memory Multiprocessors," *ACM,* http://www.logos.t.u-tokyo.ac.jp/~tau/os-lecture/articles/p137-rosenburg.pdf#search=%22Translation-lookaside%20buffer%20consistency%22, 1989, 137-146.

Taylor, G. et al., "The TLB Slice—A Low-Cost High-Speed Address Translation Mechanism," IEEE, http://delivery.acm.org/10.1145/330000/325161/p355-taylor/pdf?key1=325161&key2=8514904611&coll=GUIDE&dl=GUIDE&CFID=4997640&CFTOKEN=80512607, 1990, 355-363.

Uhlig, V. et al., "Towards Scalable Multiprocessor Virtual Machines," *Proceedings of the 3$^{rd}$ Virtual Machine Research & Technology Symposium, San Jose, CA,* http://14ka.org/publications/2004/Towards-Scalable-Mutliprocessor-Virtual-Machines-VM04.pdf May 6-7, 2004, 1-14.

VMware, Inc., "vmi_spec: Paravirtualization API Version 2.0," www.vmware.com/pdf/vmi_cpecs.pdf, 2006, 1-35.

* cited by examiner

OPERATIONAL EFFICIENCY OF VIRTUAL TLBS

FIELD OF TECHNOLOGY

The presently disclosed subject matter relates to the field of computing, and more particularly, to computer virtualization, although virtualization is merely an exemplary and non-limiting field.

BACKGROUND

A virtual machine monitor (VMM), such as a hypervisor, is a program that creates virtual machines, each with virtualized hardware resources which may be backed by underlying physical hardware resources. To virtualize memory, the VMM can implement virtual translation look-aside buffers (TLBs) that cache address translations from page tables specified by guest operating systems, much like TLBs associated with physical processors. However, the process to introduce new translations into virtual TLBs, known as a TLB miss, is very expensive. Thus, it would be advantageous to improve the performance of virtual machines by reducing the miss rate in virtual TLBs by caching and retaining more translations over time, which substantially improves the performance of virtual machines.

SUMMARY

Various mechanisms are disclosed herein for improving the operational efficiency of a virtual translation look-aside buffer (TLB) in a virtual machine environment. For example, one mechanism fills in entries in shadow page table (SPTs) and speculatively fills in other entries in the SPTs based on various heuristics. Another mechanism allows virtual TLBs to cache partial walks in guest page table trees. Still another mechanism allows for dynamic resizing of virtual TLBs to optimize for run-time characteristics of active workloads. Still another mechanism allows a virtual machine monitors (VMM) to support legacy and enlightened modes of virtual TLB operation. Finally, another mechanism allows the VMM to remove only the stale entries in SPTs when linking or switching address spaces. All these mechanisms, together or in part, increase the operational efficiency of the virtual TLB.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION

Overview

The various aspects of the presently disclosed subject matter are divided into the following sections: (1) virtual machines in general terms; (2) virtual machine translations and caches; and (3) improvement of operation efficiency of virtual TLBs. All of these sections, when read individually, are meant to be read in light of the remaining sections. The present disclosure is not limited to any one of these aforementioned sections.

Virtual Machines in General Terms

Figure 1:
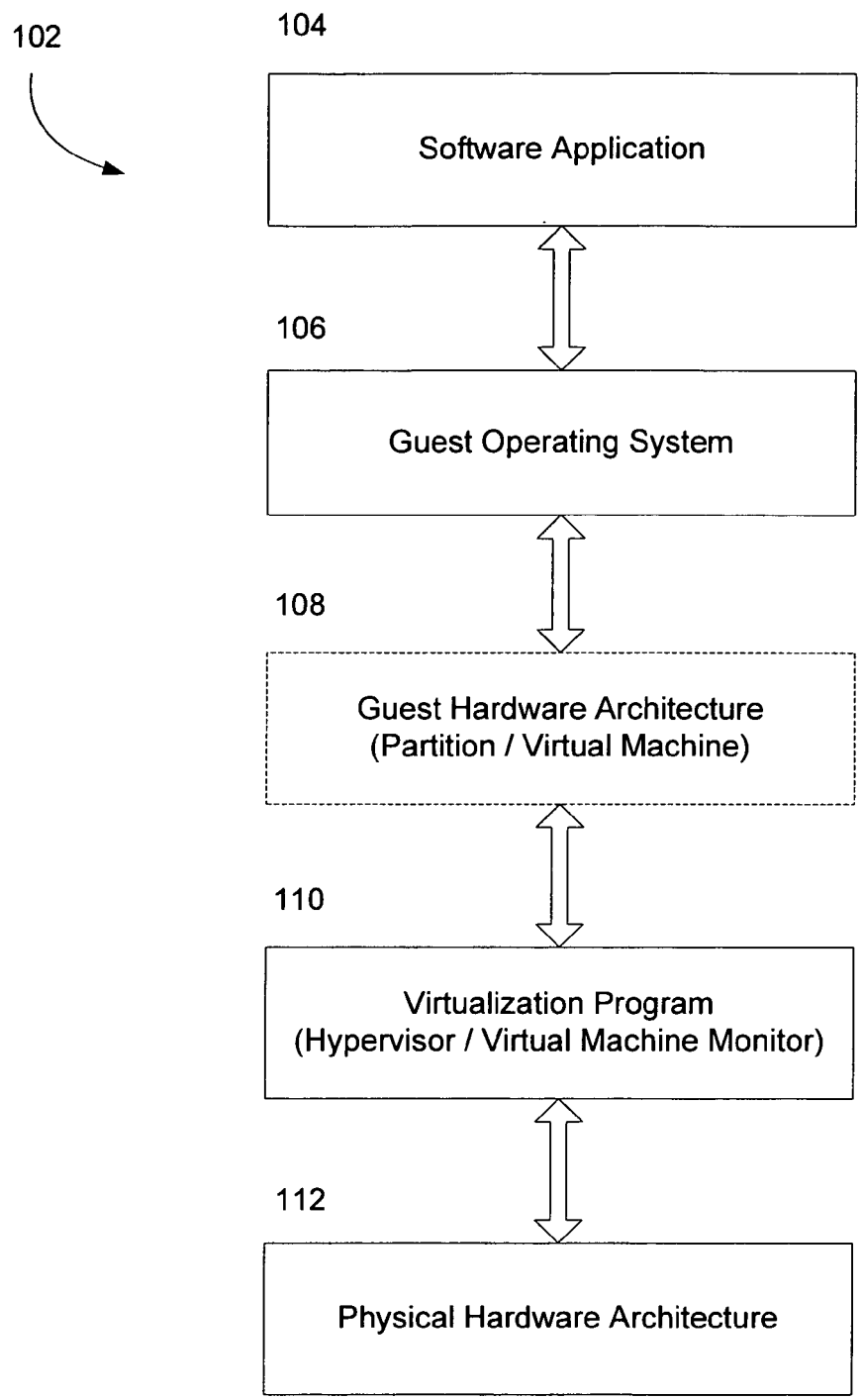
FIG. 1 is a block diagram representing the logical layering of the hardware and software architecture for virtualized operating environment in a computer system.

FIG. 1 is a diagram representing the logical layering of the hardware and software architecture for a virtualized environment in a computer system. In FIG. 1, a virtualization program 110 runs directly or indirectly on the physical hardware architecture 112. The virtualization program 110 may be (a) a virtual machine monitor that runs alongside a host operating system, (b) a host operating system with a hypervisor component, where the hypervisor component performs the virtualization, (c) hardware, or (d) micro-code. The virtualization program 110 virtualizes a guest hardware architecture 108 (shown as dashed lines to illustrate the fact that this component is a "partition" or a "virtual machine"), that is, hardware that does not actually exist but is instead virtualized by the virtualizing program 110. A guest operating system 106 executes on the guest hardware architecture 108, and a software application 104 can run on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2:
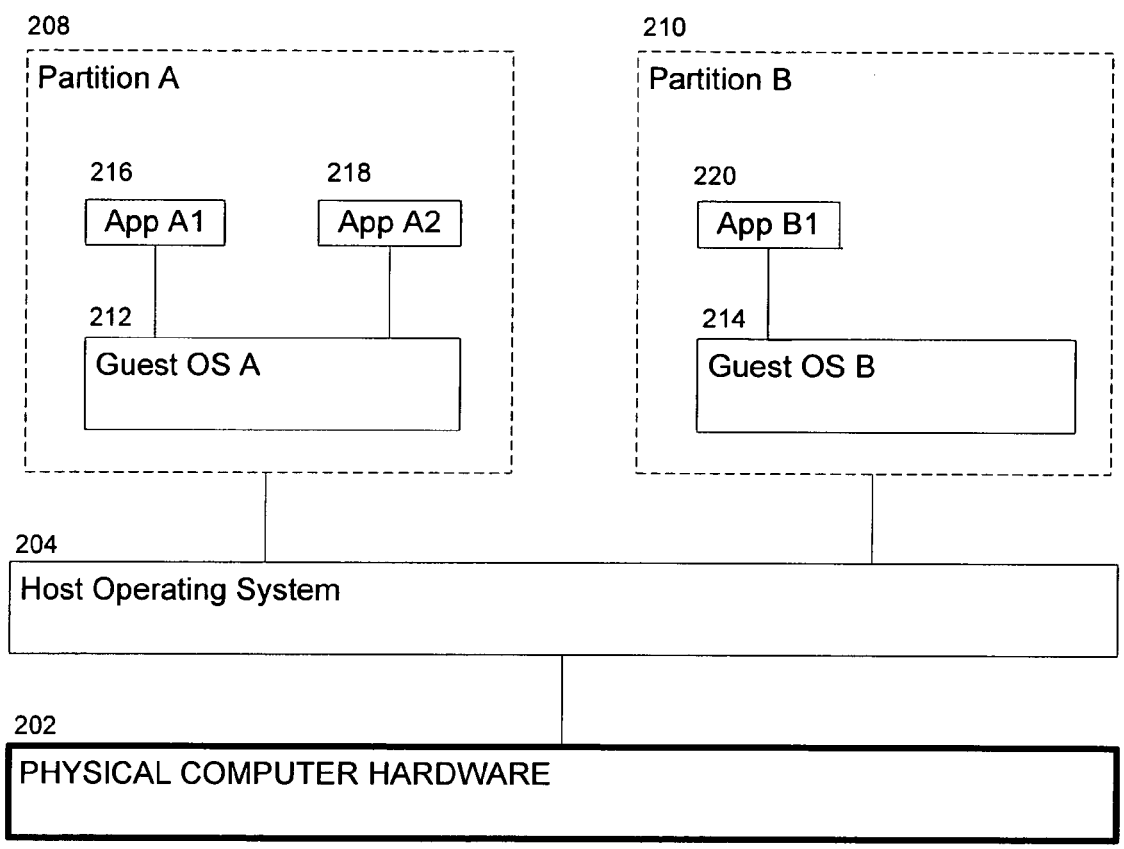
FIG. 2 is a block diagram representing a virtualized computing system, where virtualization is performed by the host operating system (either directly or via a hypervisor)

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that may exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 3:
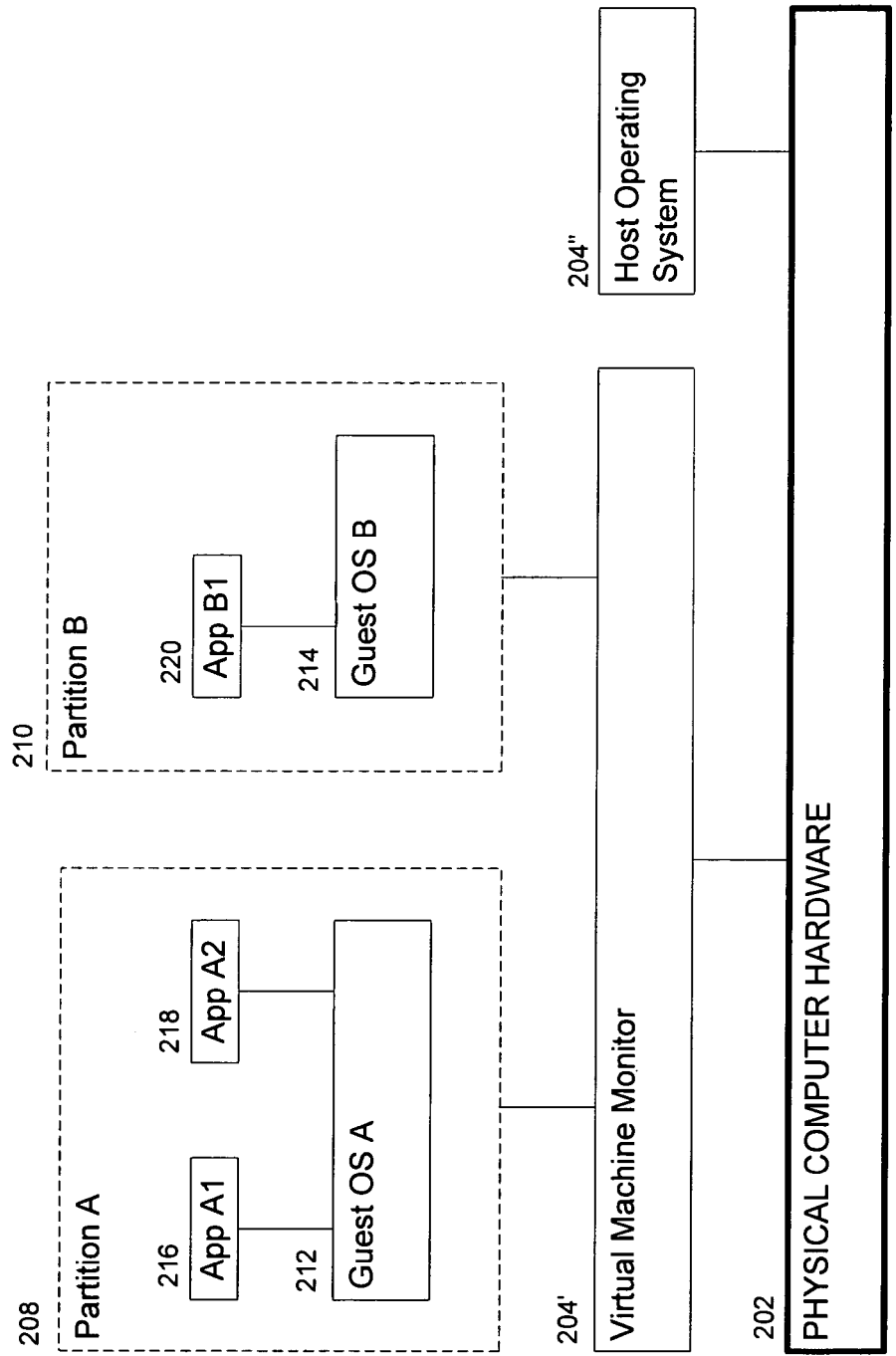
FIG. 3 is a block diagram representing an alternative virtualized computing system, where virtualization is performed by a virtual machine monitor (VMM) running alongside a host operating system.

FIG. 3 illustrates an alternative virtualized computing system where the virtualization is performed by a virtual machine monitor (VMM) 204' running alongside the host operating system 204". In certain cases, the VMM 204' may be an application running above the host operating system 204" and interacting with the computer hardware 202 only through the host operating system 204". In other cases, as shown in FIG. 3, the VMM 204' may instead comprise a partially independent software system that on some levels interacts indirectly with the computer hardware 202 via the host operating system 204", but on other levels the VMM 204' interacts directly with the computer hardware 202 (similar to the way the host operating system interacts directly with the computer hardware). And yet in other cases, the VMM 204' may comprise a fully independent software system that on all levels interacts directly with the computer hardware 202 (similar to the way the host operating system interacts directly with the computer hardware) without utilizing the host operating system 204" (although still interacting with the host operating system 204" in order to coordinate use of the computer hardware 202 and avoid conflicts and the like).

All of these variations for implementing the above mentioned partitions are just exemplary implementations, and nothing herein should be interpreted as limiting the disclosure to any particular virtualization aspect.

Virtual Machine Translations and Caches

As was mentioned above, a virtual machine monitor (VMM), such as a hypervisor, is a program that creates virtual machines, each with virtualized hardware resources which may be backed by underlying physical hardware resources. The operating system that runs within a virtual machine can be referred to as a guest. Each page of guest memory may be backed by a page of physical memory, but the physical address exposed to the guest is typically not the same as the actual physical address on the physical machine. In addition, the guest typically cannot access physical memory that has not been allocated to the virtual machine.

Many processor architectures can enforce a translation from virtual addresses (VA) to physical addresses (PA), specified by the operating system using data structures such as page tables. An address space can comprise of a tree of page tables, which may correspond to a sparse map from VAs to PAs. Programs running on the operating system access memory via virtual addresses, which enables operating systems to virtualize their memory and control their access to memory. The VMM can make an additional translation from guest physical addresses (GPA) to system physical addresses (SPA) to virtualize guest memory.

The guest operating system maintains guest page tables (GPT) that specifies GVA-to-GPA translations. The VMM enforces GPA-to-SPA translations and maintains shadow page tables (SPTs) that specify GVA-to-SPA translations, caching GVA-to-GPA translations from the guest page tables. The VMM points the physical processor to the SPTs so the guest software gets the correct system physical page when accessing a GVA.

Many processor architectures have a translation lookaside buffer (TLB) to cache VA-to-PA translations to avoid having to walk the page tables on every memory access, which is expensive. When the accessed VA is not cached in the TLB, which is known as a TLB miss, the processor's memory management unit (MMU) must walk the page tables starting from the base of the page table tree specified by the operating system, or the VMM in this case. The MMU can then add the VA-to-PA translation to the TLB, known as a TLB fill.

Some processor architectures define the TLB as a non-coherent cache of the page tables. The operating system or the VMM is responsible for notifying the processor of changes to the translations in its page tables to ensure the TLB does not have inconsistent or stale translations. Those processor architectures provide instructions to invalidate cached translations at a few granularities, such as invalidating a single translation and invalidating all translations. Architectures such as x86 and x86-64 invalidate all (non-global) cached translations when the register that points to the base of the page table tree is modified to switch between address spaces. The shadow page tables cache GVA-to-GPA translations in the guest page tables, effectively acting as a virtual TLB.

Figure 4:
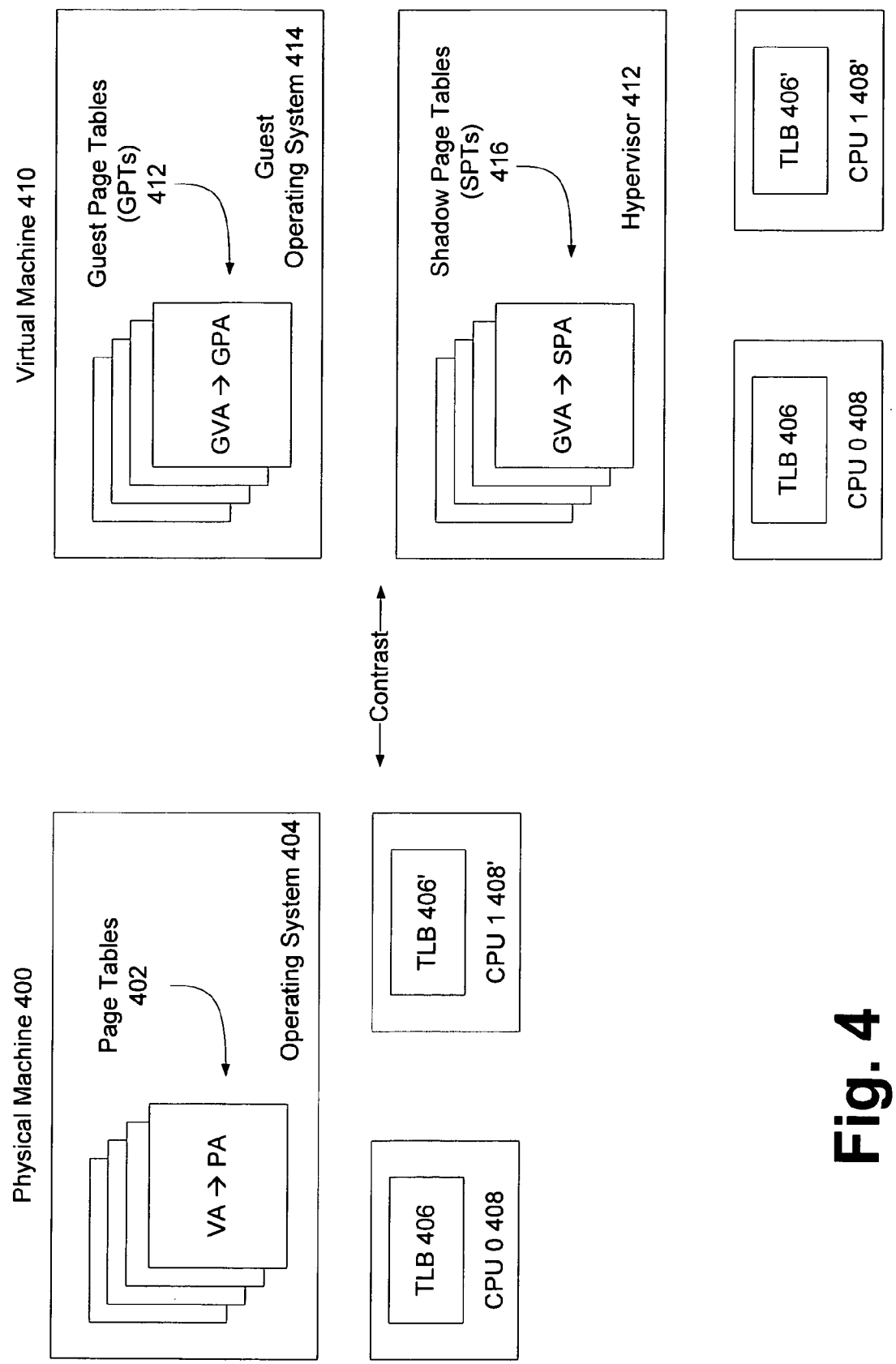
FIG. 4 illustrates the contrast between a physical machine architecture and a virtual machine architecture in order to further explain how terms, such as virtual addresses (VAs), physical addresses (PAs), guest virtual addresses (GVAs), guest physical addresses (GPAs), system physical addresses (SPAs), guest page tables (GPTs), shadow page tables (SPTs), and so on, relate to one another.

FIG. 4 illustrates the contrast between a physical machine 400 architecture and a virtual machine architecture 410, in order to further explain how all the terms discussed above and below, namely, how VAs, PAs, GVAs, GPAs, SPAs, GPTs, SPTs relate to one another. Specifically, a physical machine 400 may have its own associated pages tables 402 that contain VA-to-PA translations. Moreover, these VA-to-PA translations may be cached in TLBs on a per-processor basis: TLB 406 is associated with CPU 0 (central processing unit 0) 408, while TLB 406' is associated with CPU 1 408'.

In contrast to this physical machine 400 architecture, a virtual machine 410 architecture that is build on top of the physical machine 400, has more complex layers of page tables, namely, there are GPTs and SPTs. Per FIG. 4, GPTs 412 contain GVA-to-GPA translations associated with some guest operating system 414. Additionally, a VMM, such as a hypervisor 412, maintains SPTs that act as kind of virtual TLBs (vis-à-vis TLBs 406 and 406'). The virtual machine 410 architecture, just as the physical machine 400 architecture, also uses physical TLBs: TLB 406 and TLB 406', corresponding to CPU 0 408 and CPU 1 408', respectively.

The VMM builds up a cache of translations in the virtual TLB on demand as the guest accesses memory. The virtual TLB initially may not cache any translations. When the guest accesses a GVA for the first time, the processor generates a page fault exception and notifies the VMM of the virtual TLB miss, since there was no translation for that GVA in the SPT tree. The miss handler performs a virtual TLB fill at that GVA by walking the GPT tree to that GVA, reading the GVA-to- GPA translation, translating the GPA to an SPA, and filling the SPT entry with the newly cached GVA-to-SPA translation.

Figure 5:
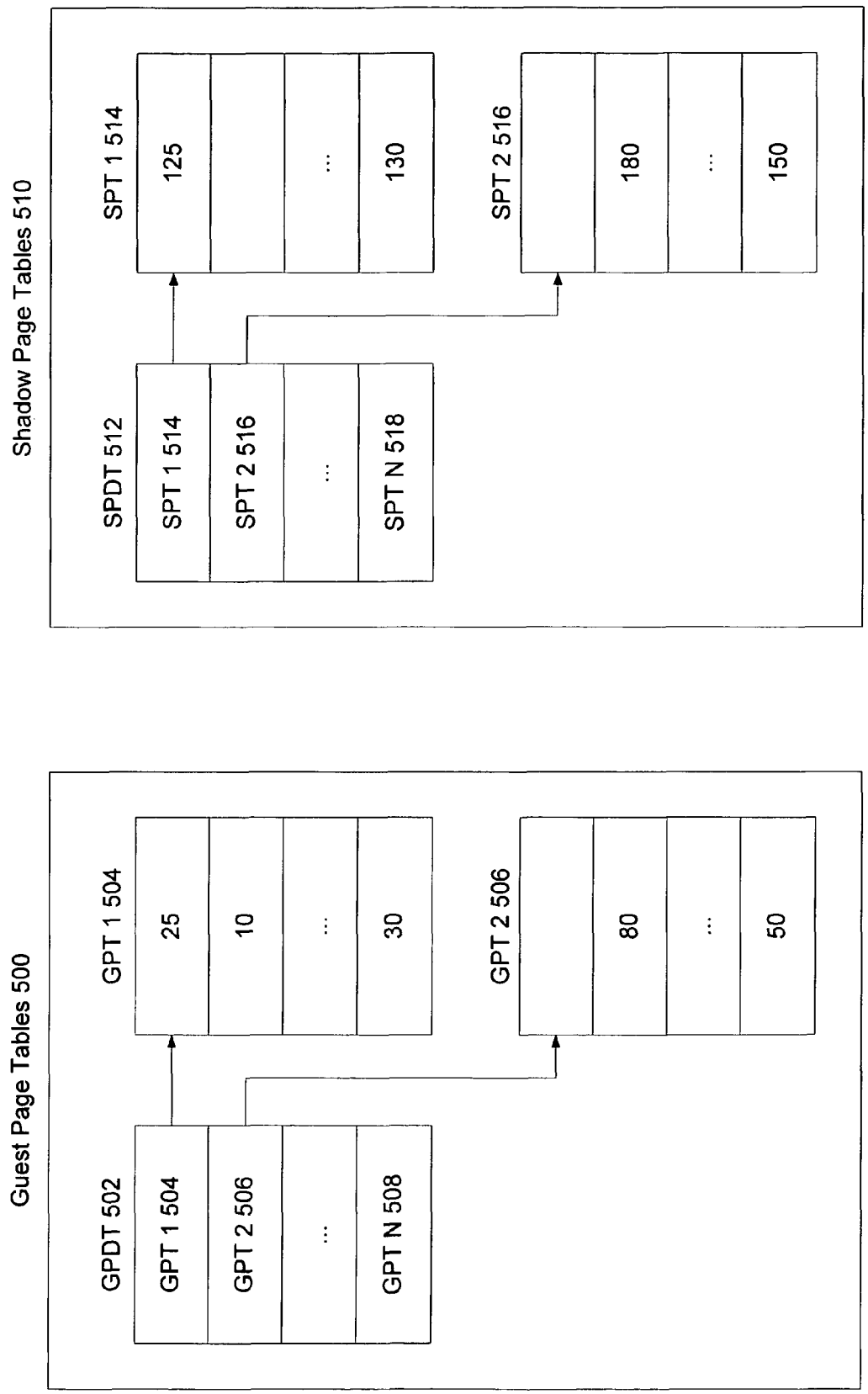
FIG. 5 illustrates the notion of performing a fill in a virtual TLB (comprised of shadow page tables) upon a miss.

FIG. 5 illustrates the notion of performing a fill in a virtual TLB upon a miss. A collection of guest page tables 500 are shown. A guest page directory (GPDT) 502 maintains a listing of all its corresponding guest page tables: GPT 1 504, GPT 2 506, and so on, until the last GPT N 508 (not shown)—page tables that are leaves in a tree such as GPT 1 504 and GPT 2 506 can be referred to as leaf or terminal page tables. The first guest page table, GPT 1 504, may have various entries, for example, guest physical addresses (25, 10, 30, and so on, which may have corresponding GVA entries—not shown). Similarly, the second guest page table, GPT 2 506, may have various guest physical address entries, such as 80, 50, and so on. A fill in a virtual TLB (upon a miss), may start out by having a miss handler walk the GPDT 502, identify the correct GPT, and then read the identified GPT entries.

For example, the miss handler could read entry "50" in GPT 2 506 and translate this guest physical address to a system physical address, say, "150". This latter value then, is filled in the corresponding shadow page table (acting as a virtual TLB), namely, SPT 2 516. Specifically, the entry "150" is placed in the appropriate slot of the SPT 2 516, which corresponds to the entry "50" in a slot of the GPT 2 506. Other values are similarly synchronized between guest page tables 500 and shadow page tables 510.

On the other hand, if a guest invalidates GVAs, the VMM must remove the GVA-to-SPA translations from the SPTs and the underlying hardware TLBs. It is expensive to flush virtual TLBs whenever the guest switches between address spaces. Thus, as will be shown next, in other aspects of the presently disclosed subject matter, performance and scalability of guest memory virtualization algorithms can be improved on by building upon other related and commonly assigned subject matter disclosed in U.S. patent application Ser. No. 11/128,982, entitled "Method and system for caching address translations from multiple address spaces in virtual machines" (disclosing algorithms implementing tagged TLBs in software, which cache and retain translations from multiple address spaces at a time, maintaining multiple shadow address spaces, each of which is a tree of shadow page tables, and caching translations from a guest address space), and U.S. patent application Ser. No. 11/274,907, entitled "Efficient operating system operation on a hypervisor" (describing how the VMM can expose a set of APIs known as hypercalls, some of which perform virtual TLB operations; those operations enable an enlightened guest to provide hints and use less expensive virtual TLB operations).

Improvement of Operational Efficiency of Virtual TLBs

In one aspect of the presently disclosed subject matter, virtual TLBs speculatively cache translations. The cost of servicing a miss in virtual TLBs may be much greater than the cost of performing one or more speculative fills in the virtual TLBs. The VMM may predict the GVAs that may be accessed by the guest using various heuristics and perform speculative fills at those GVAs. These speculative fills are worthwhile if the guest subsequently accesses a preemptively cached GVA translation, thus avoiding a miss in the virtual TLB.

The VMM may fill additional entries in a SPT other than the entry at which the miss happened, since the guest may access memory close to the GVA that caused the miss. However, the VMM may also perform speculative fills for many other reasons. For instance, it may have performed some operation for the guest or notified the guest of some event and it knows that the guest will most likely access a specific page in response to the event. It may rely on hints from the guest operating system such as virtual addresses invalidated as a group or the history of virtual addresses that incurred misses in the virtual TLB. This method reduces the miss rate in the virtual TLB when applied with good heuristics.

Figure 6:
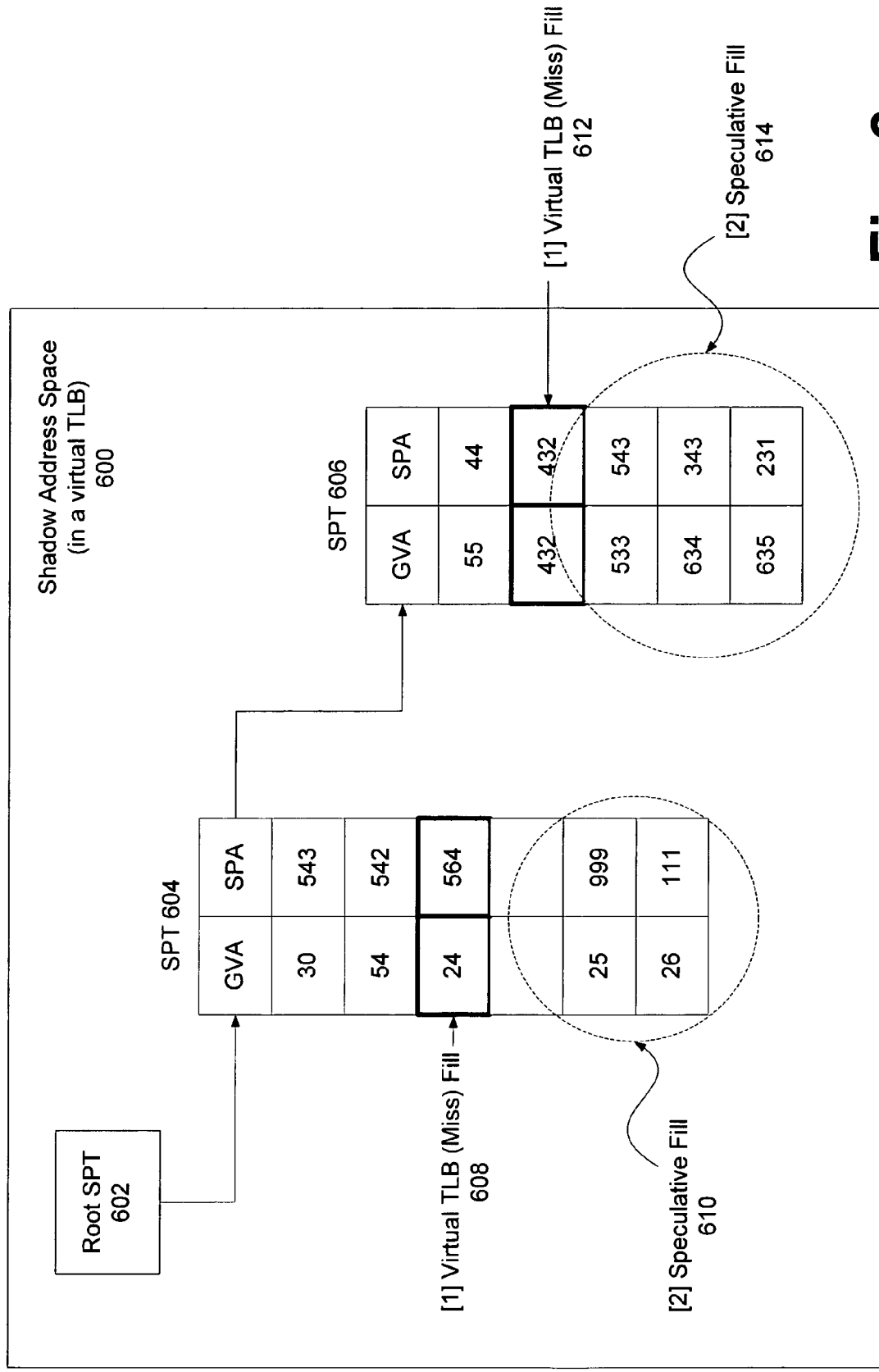
FIG. 6 illustrates how virtual TLBs speculatively cache translations.

Thus, FIG. 6 illustrates how virtual TLBs can speculatively cache translations. Various shadow page tables are shown in a tree structure, i.e., a shadow address space (SAS) 600 (which may be a subset of the virtual TLB). Specifically, a root SPT 602 is shown, where the root SPT 602 may have references to other SPTs 604, 606. In the first non-root SPT 604, a virtual TLB miss (e.g. a non-existent entry, a stale entry, and so on) may be filled 608 by a VMM. In the scenario shown, first a TLB miss is identified, and then it is actually filled 608. Thus, the entry "24" for the portion of the GVA corresponds to an entry of "564" for the SPA. However, because the VMM speculates that other related entries may also be accessed in the future by virtual processors running in a virtual machine (or other virtual devices running in the virtual machine), the entries "25" and "26" for the portion of the GVA may be filled, having corresponding entries of "999" and "111", respectively. Similarly, other entries in other shadow page tables, namely, SPT 606 may be speculatively filled 614 based on the fill 608 in the first SPT 604 or based on local fills 612.

This speculative fill 610, which was not based on the original miss, may be based on various predetermined heuristics. For example, the speculative fill 610 shown can be based on accesses to contiguous ranges of virtual addresses ("25" and "26" being contiguous to the filled in "24"). However, as mentioned above, other heuristics can be used. For instance, if large pages in memory are used, namely, those bigger than the typical 4 kilobyte pages, e.g. 2 megabyte pages, if one GVA entry is a miss, all the other VAs within the large page may be speculatively filled in (or a portion thereof) following the satisfaction of the original miss. Thus, speculative filling may be based on a page-by-page basis.

Speculative fill heuristics may be performed based on various events. The speculative fill may also occur during operations other than fills such as invalidations, flushes, and address space switches. If the VMM speculates, whether based on history or some characteristics of an operation, that certain GVAs will likely be accessed, then it may pre-fill any non-existent or stale entries in shadow page tables to avoid subsequent misses.

Figure 7:
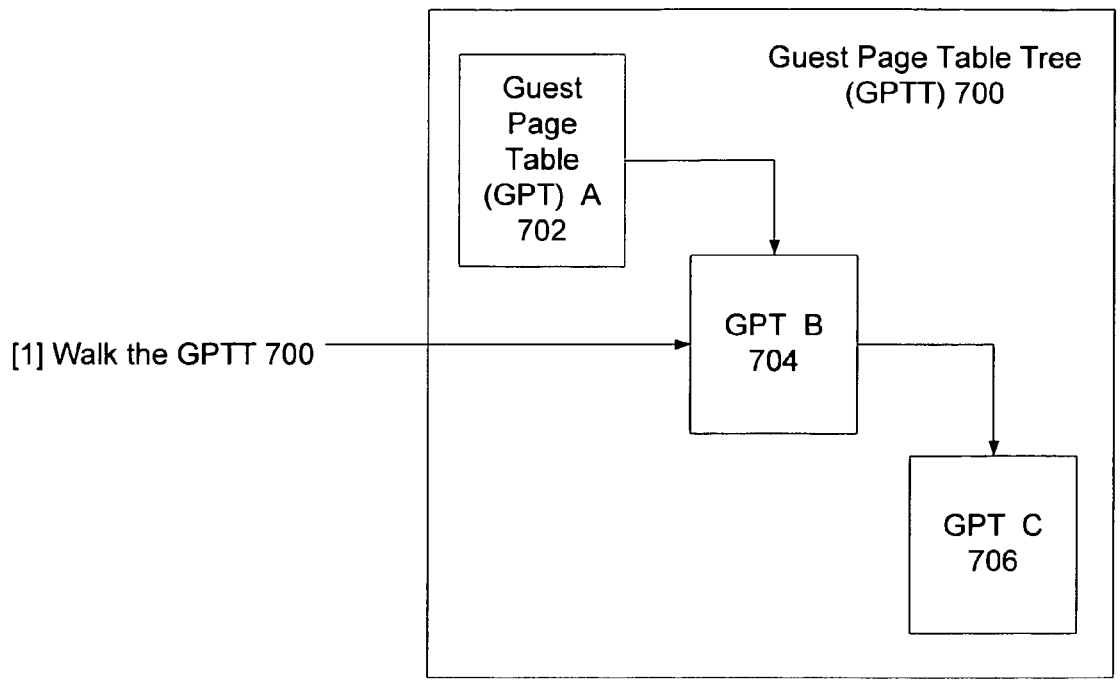
FIG. 7 illustrates how virtual TLBs cache partial walks performed in guest page table trees.
Figure 7:
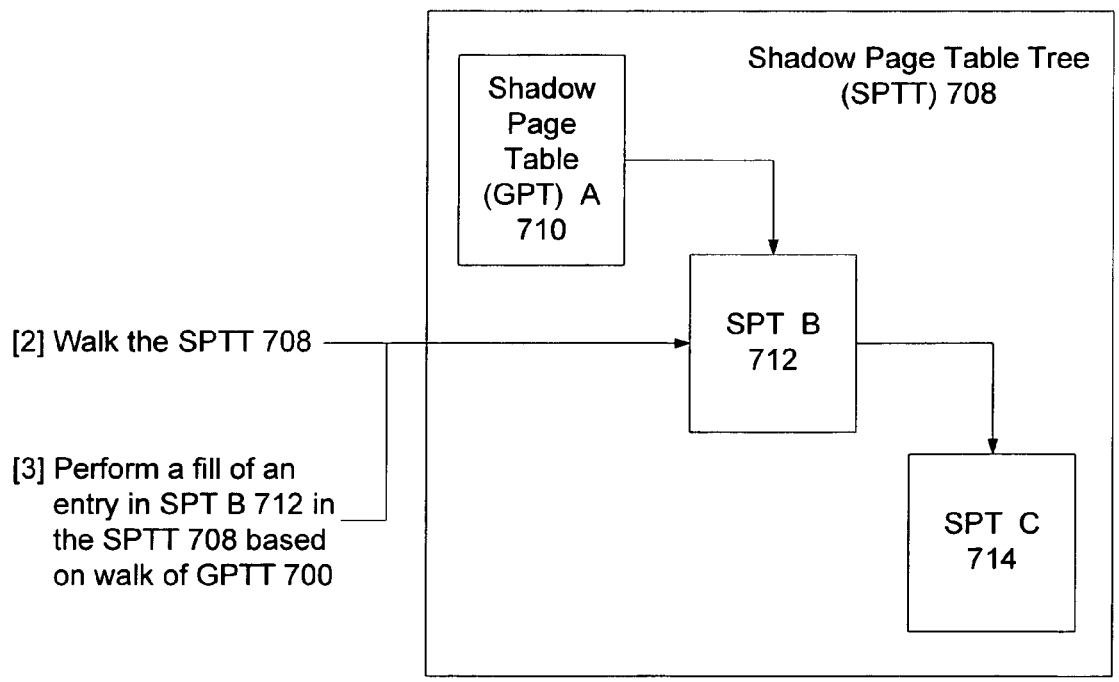

Next, in another aspect of the presently disclosed subject matter, FIG. 7 shows that a virtual TLB can cache partial walks in guest page table (GPT) trees. A GVA-to-GPA translation can be defined by a complete walk of a GPT tree (GPTT), which can be synonymous with a guest address space (GAS), from the root GPT to a terminal GPT. A partial walk of the GPTT can include information accumulated by walking through one or more non-terminal GPTs in the GPTT. Non-stale page tables in a SPT tree or a SPTT (i.e. SPTT can be synonymous with a shadow address space, SAS, discussed above) cache partial walks of the GPT tree, so the VMM can bypass walking the corresponding page tables in the GPT tree when performing a fill of the virtual TLB.

To perform a fill, the VMM walks the SPTT through non-terminal SPTs until it reaches a stale or non-present SPT entry at which point it fills in the SPT entry by walking the corresponding GPT in the GPT tree. The cached partial walk can terminate at a non-present SPT entry. During a fill, the VMM may not be able to walk through a stale SPT because a GPT entry may have been modified since the partial walk through that GPT entry was cached in the virtual TLB. Thus, this aspect of the present disclosure reduces the cost of performing a fill in the virtual TLB by skipping walks through parts of the GPTT already cached as partial walks in the SPTT, particularly on processor architectures with several levels in the page table trees.

FIG. 7 illustrates how virtual TLBs cache partial walks performed in guest page table trees. Specifically, a VMM can first walk the SPTT 708 through SPT A 710, skipping a walk through the top part of the GPTT 700. If the VMM reaches a non-existent or stale entry in SPT B 712, it can fill this entry (and/or any other such entries) based on data (the mapping of GVA-to-GPA) found in the corresponding GPT B 704. Thus, this process obviates the need to read from GPT A 702 if the partial walk is already cached in the SPTT and is not stale.

Figure 8:
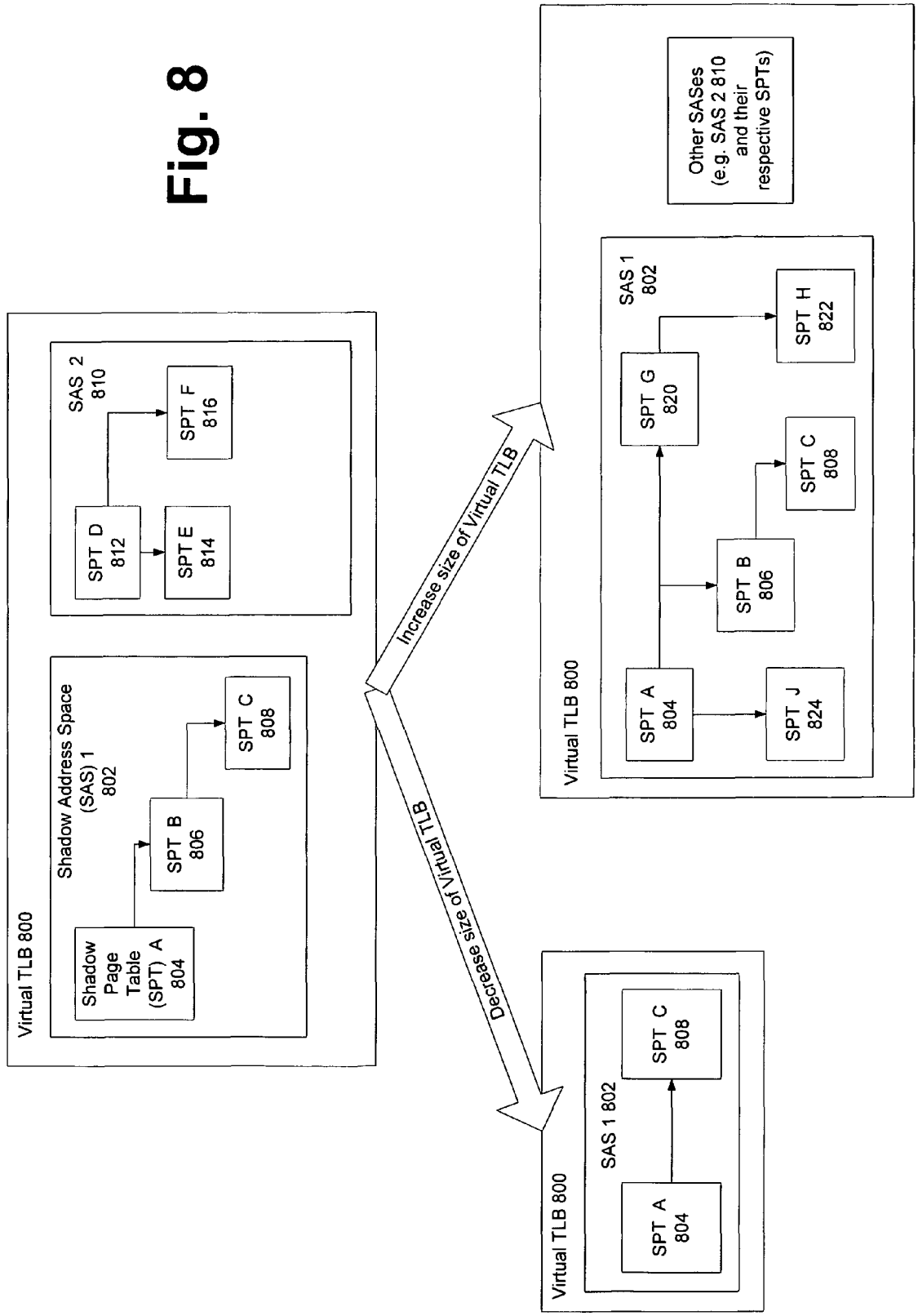
FIG. 8 illustrates that the size of the virtual TLB is resized dynamically to optimize for the run-time characteristics of active workloads in a virtual machine.

In yet another aspect of the presently disclosed subject matter, FIG. 8 shows that the size of virtual TLBs can be resized dynamically to optimize for the run-time characteristics of active workloads in a virtual machine. The working set of GVAs that are frequently accessed varies greatly depending on the workload(s) running in the virtual machine. The virtual TLB can cache the translations for the GVAs in the working set to achieve a low miss rate (but the benefit of caching the translations outside of the working set may be limited). Similarly, this applies to the working set of guest address spaces.

To scale well to both large and small workloads, the VMM may dynamically adjust the size of the virtual TLB based on the run-time characteristics of the workload. The adjustable parameters include but are not limited to the number of shadow address spaces (SASes) or shadow page tables (SPTs). Heuristics to decide whether to enlarge the virtual TLB include tracking the rate at which SASes and SPTs are evicted. Heuristics to decide whether to shrink the virtual TLB include examining the number of free resources and decaying the size over time. One aspect of this disclosure expands the virtual TLB to decrease the miss rate, but up to the point where the increased memory footprint and cost of managing a larger virtual TLB outweighs the benefit of further reducing the miss rate.

FIG. 8 shows a virtual TLB 800 with a couple of SASes: SAS 1 802 and SAS 2 810. These SASes have their respective sets of SPTs: SPT A 804, SPT B 806, and SPT C 808, in the case of SAS 1 802; and SPT D 812, SPT E 814, and SPT F 816, in the case of SAS 2 810. It is understood that a different plurality of SASes could be persisting in the virtual TLB 800, and that a different plurality of SPTs could also be used, depending on the workload that is required.

As mentioned above, the virtual TLB 800 can be resized, either made bigger or smaller, based on various heuristics. FIG. 8 shows that the virtual TLB 800 could be decreased from the state described above, to a state where the virtual TLB 800 contains only SAS 1 802, and within this SAS it has SPT A 804 and SPT C 808. Just as easily, however, the virtual TLB 800 could increase in size to contain more SASes and more SPTs, again, depending on the associated workload. Thus, as FIG. 8 illustrates, additional SPTs can be added to each SAS, such as SAS 1 802. Specifically, SPT G 820, SPT H 822, and SPT J 824 have been added to accommodate a situation when the working set of pages (i.e. a set of virtual addresses associated with the pages that are germane, for example, to runtime functionalities—but not limited to such functionalities) accessed frequently increases beyond what the virtual TLB 800 can map. Additional SPTs can be added to other SASes, such as SAS 2 810.

In FIG. 8, the heuristics to shrink the virtual TLB 800 from two SASes to one SAS (and from six total SPTs to two SPTs), as mentioned, could be based on examining the number of free resources in these SASes and SPTs and decaying the size over time of the SASes and SPTs. Alternatively, the shown SASs and SPTs could be increased by tracking the rate at which SASes and SPTs are evicted. If the eviction rate is high (e.g. past some predetermined baseline rate) this suggests that more resources may need to be allocated to decrease the eviction rate. One basic heuristic, in addition to the various heuristics mentioned above, could expand the virtual TLB 800 to decrease the miss rate but up to the point where the increased memory footprint and cost of managing a larger virtual TLB outweighs the benefit of further reducing the miss rate.

Figure 9:
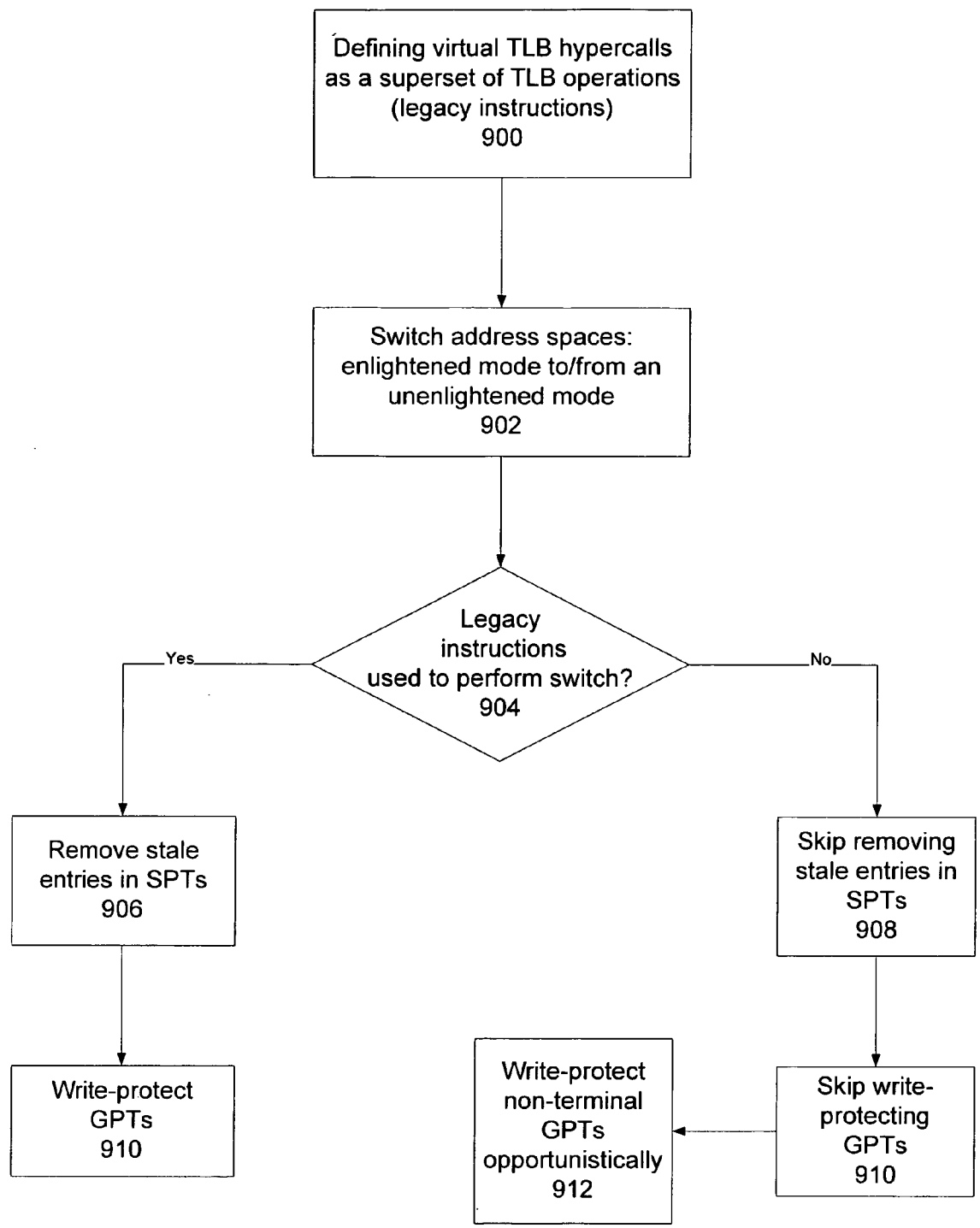
FIG. 9 illustrates the notion that a VMM can support legacy and enlightened modes of virtual TLB operation, without requiring a guest operating system to explicitly switch between the two modes.

Next, FIG. 9 illustrates the notion that a VMM can support legacy and enlightened modes of virtual TLB operation, without requiring a guest operating system to explicitly switch between the two modes. An enlightened mode means that the guest operating system is aware of the fact that it is being virtualized by the VMM (in contrast to unenlightened virtual devices and processors that are unaware of such virtualization; enlightenment allows for the implementation of various efficiencies in a virtual machine environment).

According to the present aspect of the disclosure, the VMM can remove stale translations in the virtual TLB when a guest performs an address space switch by executing a legacy TLB operation that requires a TLB flush. To determine which translations are stale, the VMM intercepts modifications to GPTs and marks the corresponding SPTs stale. However, the GPT edit detection is expensive as it increases the miss rate in the virtual TLB and the cost of fills and address space switches. To mitigate this cost, the VMM can expose a hypercall to perform an enlightened address space switch, which does not flush the TLB.

Thus, one of the problems that this aspect of the present disclosure solves is how to enable and disable page table edit detection depending on whether the guest is enlightened, without creating two modes of virtual TLB operation with different semantics. Having two modes may create complications when an enlightened guest also uses legacy TLB instructions, perhaps due to a third-party drivers that have not been enlightened.

This aspect recognizes the fact that GPTs only need to be write-protected to detect modifications only if the guest switches between address spaces using a legacy instruction, such as MOV CR3 on x86. If the guest uses the enlightened switch hypercall which does not flush the TLB, the VMM does not need to detect and remove the stale translations in the virtual TLB. Hence, the VMM can skip write-protecting GPTs since allowing all shadow page tables to become stale does not affect performance.

A further improvement on this aspect is to write-protect only the non-terminal GPTs opportunistically during operations such as fills and address space switches since the non-terminal SPTs must not be stale to cache partial walks. This hybrid solution supports page table edit detection for legacy guests, but effectively eliminates the overhead of page table edit detection when the guest is enlightened, without requiring two separate modes of virtual TLB operation.

Thus, in summary, this aspect could be implemented in the following steps as shown in FIG. 9. At block 900, defining virtual TLB hypercalls as a richer set of standard TLB operations, such that the semantics of existing TLB instructions in a processor architecture are preserved. Next, at block 902, processing a switch between address spaces, whether the switch is from an enlightened mode to an unenlightened mode, or vice-versa. Then, at block 904, determining whether legacy instructions are used to perform the address switch (as opposed to the TLB hypercalls): if so, at block 906, removing stale entries in the SPTs and, at step 910, write-protecting GPTs. Alternatively, at block 904, if such legacy instructions are not used, then at block 908, skipping removing the stale entries in the SPTs and, at block 910, skipping write-protecting GPTs, and, furthermore, at block 912, write-protecting non-terminal GPTs opportunistically to take advantage of cached partial walks to reduce the cost of servicing misses in the virtual TLB. For instance, if the fact that an SPT is stale is causing the VMM to consult the corresponding GPT frequently when performing fills, a heuristic might write-protect that GPT as part of making that SPT non-stale.

Figure 10:
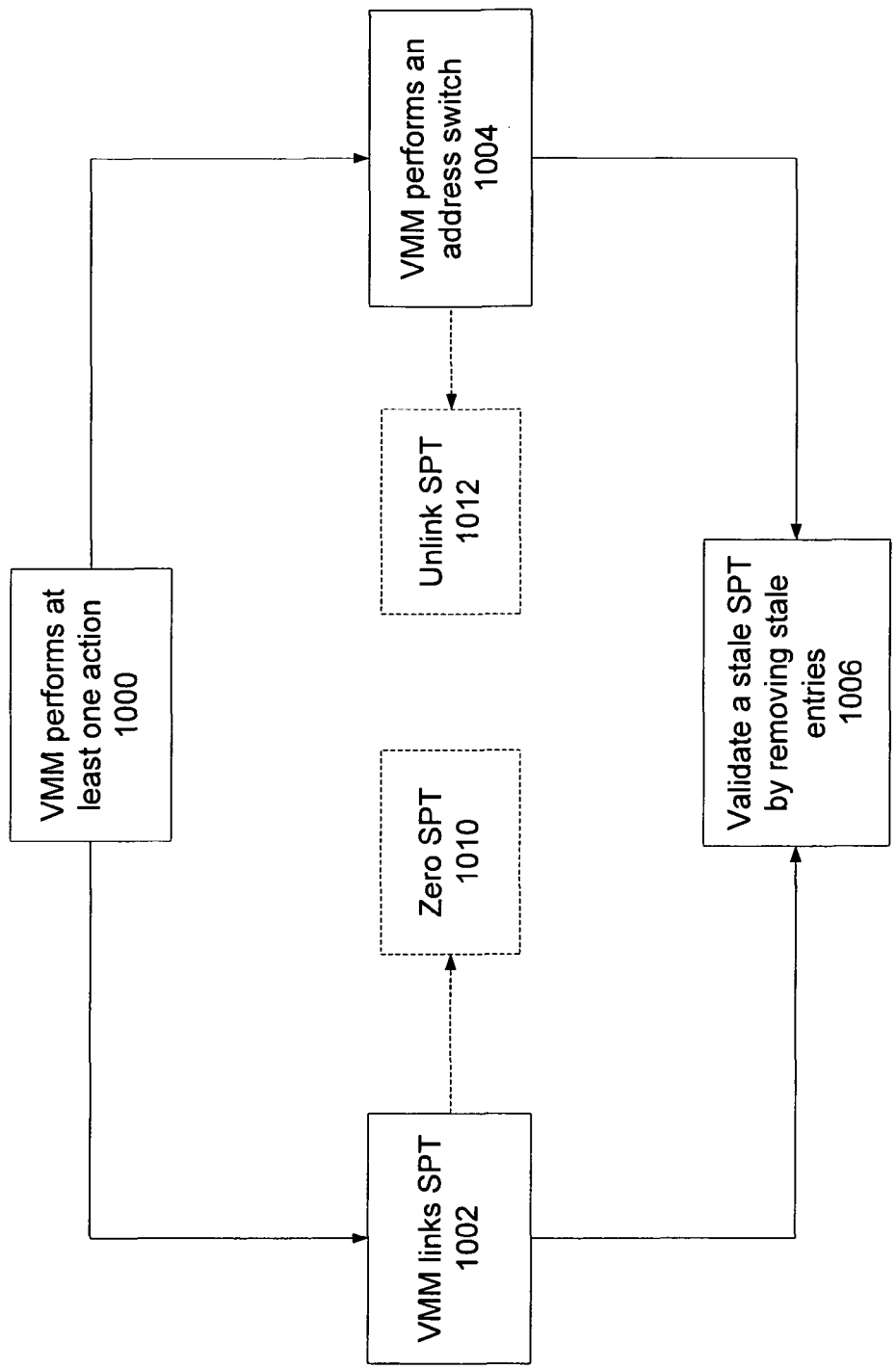
FIG. 10 illustrates the removal of stale entries in SPTs when the VMM links in the SPTs or when guests switch address spaces.

Lastly, in yet another aspect of the presently disclosed subject matter, FIG. 10 illustrates the removal of stale entries in SPTs when the VMM links in the SPTs (i.e. pointing entries in non-terminal SPTs in the tree to the SPTs) or when guests switch address spaces. The VMM can remove the stale translations in the virtual TLB when a guest performs an address space switch by executing a legacy TLB operation that requires a TLB flush. To determine which translations are stale, the VMM intercepts modifications to guest page tables and marks the corresponding SPT stale. On the switch, the VMM can simply unlink the stale SPT from the tree, but this discards all of the cached translations in that SPT, many of which may not be stale. Thus, in this aspect, an option is provided for validating the stale SPTs by referring to the GPT and determining which SPT entries are stale.

Unlinking a page table is fast but results in subsequent virtual TLB misses. Moreover, validating a page table is expensive since every entry in the page table must be checked, but this reduces subsequent virtual TLB misses. This aspect can be used with heuristics to determine whether to validate or unlink a shadow page table. Such heuristics can be based, for example, on the number of present entries in the SPTs or on the time it would take to validate them (vis-à-vis unlinking or zeroing page tables).

For example, FIG. 10 illustrates, at block 1000, that a VMM may perform some action, such as at block 1002, link in a SPT or, at block 1004, perform an address switch. In the former case, where a SPT is linked, stale entries in the SPT are removed at block 1006 instead of zeroing in the entire SPT (at block 1010) prior to linking. In the latter case, where the VMM performs an address switch, SPTs are validated, at block 1006, instead of being unlinked. Such validation would be associated with the removal of only those entries in the SPT that are stale. As mentioned already, various heuristics can be used to determine whether to validate, on the one hand, or zero before a link (block 1010) or unlink (block 1012), on the other. The optimal performance of a virtual machine may be one such heuristic, including the frequency and cost of operations that are associated with the VMM implementing this mechanism, and so on.

The methods, systems, apparatuses of the presently disclosed subject matter may also be embodied in the form of program code (such as computer readable instructions) that is transmitted over some transmission medium, such as over electrical wiring or cabling, through fiber optics, or via any other form of transmission, wherein, when the program code is received (and/or stored on computer readable media) and loaded into and executed by a machine, such as an EPROM, a gate array, a programmable logic device (PLD), a client computer, such as that shown in the figure below, a video recorder or the like, the machine becomes an apparatus for practicing the present subject matter. When implemented on a general-purpose processor, the program code combines with the processor to provide a unique apparatus that operates to perform the saving and restoring functionality of the present subject matter.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, mechanisms were disclosed for improving the operational efficiency of virtual TLBs. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for improving operational efficiency of a virtual translation look-aside buffer (TLB) in a virtual machine environment, comprising:
   using at least one virtual TLB with at least one shadow address space (SAS) and at least one shadow page table (SPT);
   caching translations from at least one guest page table (GPTs); and
   using data from at least one of (a) said at least one of SPT or (b) said at least one GPT to perform an operation associated with said virtual TLB, said operation comprises determining whether to increase a size of the virtual TLB large enough to cache a working set of virtual addresses of said TLB and resizing said virtual TLB, said virtual TLB to increase said size up to a point where said virtual TLB is large enough to cache said working set of virtual addresses.

2. The method according to claim 1, wherein said operation comprises of performing at least one fill in at least one entry of said at least one SPT of said at least one SAS, said at least one fill is followed by at least one speculative fill of at least one additional entry in any SPT of at least one STP, said at least one speculative fill is based on at least one predetermined heuristic.

3. The method according to claim 2, wherein said at least one speculative fill occurs during at least one of (a) a servicing miss, (b) a TLB invalidation, (c) when a system of said virtual machine environment is idle, or (d) when an event that may or may not be related to said virtual TLB occurs.

4. The method according to claim 1, wherein said operation comprises of caching a partial walk of said at least one GPT of a guest page table tree (GPTT) in said at least one SPT of a shadow page table tree (SPTT) thereby enabling a virtual machine monitor (VMM) to skip rewalking the cached portion of said partial walk when performing a fill in said SPT.

5. The method according to claim 1, wherein said virtual TLB is additionally resized based on run-time characteristics of a workload in said virtual machine environment.

6. The method according to claim 1, wherein said resizing increases at least one of (a) a number of said at least one SPT (b) or a number of said at least one SAS.

7. The method according to claim 1, wherein said resizing decreases at least one of (a) a number of said at least one SPT (b) or a number of said at least one SAS.

8. The method according to claim 1, wherein said virtual TLB is resized by tracking at least one of: (a) an eviction rate for said at least one SAS from said virtual TLB and (b) an eviction rate for said at least one SPT from said virtual TLB.

9. The method according to claim 1, wherein said virtual TLB is resized by based on at least one of: (a) a number of free resources in at least one of (1) said at least one SAS or (2) said at least one SPT or (b) a decaying size over time of at least one of (1) said at least one SAS or (2) said at least one SPT.

10. The method according to claim 1, wherein said operation comprises of defining enlightened TLB operations as a superset of standard TLB operations, and furthermore, processing an address switch from one address space to another address space, wherein:
  if said standard TLB operations are used to perform said switch, removing stale entries in said at least one SPT and write-protecting said at least one GPT; and
  if said enlightened TLB operations are used to perform said switch, skipping removing stale entries in said at least one SPT and skipping write-protecting said at least one GPT.

11. The method according to claim 10, further comprising:
  write-protecting at least one non-terminal GPT opportunistically to improve a hit rate on cached partial walks by making a corresponding SPT of said GPT non-stale during operations including at least one of fills, invalidations, and address space switches if said enlightened TLB operations are used.

12. The method according to claim 10, wherein said operation comprises of validating at least one stale SPT in said virtual TLB prior to linking in the said at least one SPT to a shadow page table tree (SPTT).

13. The method according to claim 10, wherein said operation comprises of validating at least one stale SPT in said virtual TLB prior to performing an address switch.

14. A system for improving the operational efficiency of a virtual translation look-aside buffer (TLB) in a virtual machine environment, comprising:
  a computing device;
  a virtual machine monitor (VMM) stored on said computing device that performs at least one of a first operation on data shared between a shadow page table (SPT) and a guest page table (GPT) when operational wherein said first operation includes determining whether to increase a size of said virtual TLB large enough to cache a working set of virtual addresses and resizing said virtual TLB based on run-time characteristics, said virtual TLB is resized to increase said size up to a point where said virtual TLB is large enough to cache said working set of virtual addresses, and a second operation, said second operation includes performing at least one fill in at least one entry of said SPT, said at least one fill is followed by at least one additional speculative fill in said STP, said at least one speculative fill is based on at least one predetermined heuristic.

15. The system according to claim 14, wherein said first operation includes caching a partial walk of said GPT in said SPT, thereby enabling said VMM to skip rewalking the cached portion of said partial walk when performing a fill in said SPT.

16. The system according to claim 14, wherein said first operation includes defining enlightened TLB operations as a superset of standard TLB operations, and furthermore, processing an address switch from one address space to another address space, wherein:
  if said standard TLB operations are used to perform said switch, removing stale entries in said SPT and write-protecting said GPT; and
  if said enlightened TLB operations are used to perform said switch, skipping removing stale entries in said SPT and skipping write-protecting said GPT.

17. The system according to claim 14, wherein said first operation includes validating at least one stale SPT in said virtual TLB prior to at least one of (1) linking in the said at least one SPT to a shadow page table tree (SPTT) and (2) of performing an address switch according to at least one heuristic.

18. A computer readable storage device bearing computer executable instructions for improving operational efficiency of a virtual translation look-aside buffer (TLB) in a virtual machine environment, comprising:
  performing an operation comprising of one of (a) filling in at least one entry of a shadow page table (SPT), wherein said filling is followed by at least one additional speculative fill in said STP, wherein said at least one speculative fill is based on at least one predetermined heuristic, (b) caching a partial walk of a guest page table (GPT) in said SPT, thereby enabling a virtual machine monitor (VMM) to skip rewalking the cached portion of said partial walk when performing a fill in said SPT, (c) increasing the size of said virtual TLB, wherein said virtual TLB is resized to increase its size based on run-time characteristics up to a point where said virtual TLB is large enough to cache a working set of virtual addresses, (d) defining enlightened TLB operations as a superset of standard TLB operations, and processing an address switch from one address space to another address space, if said standard TLB operations are used to perform said switch, removing stale entries in said SPT and write-protecting said GPT, and if said enlightened TLB operations are used to perform said switch, skipping removing stale entries in said SPT and skipping write-protecting said GPT, and (e) validating at least one stale SPT in said virtual TLB prior to at least one of (1) linking in the said at least one SPT to a shadow page table tree (SPTT) and (2) of performing an address switch according to at least one heuristic.

* * * * *